E. DRAKE.
Upholstery-Springs.

No. 147,247.            Patented Feb. 10, 1874.

Attest:
H. L. Perrine
A. H. Norris

Inventor:
Ellis Drake
Per James L. Norris
atty

UNITED STATES PATENT OFFICE.

ELLIS DRAKE, OF STOUGHTON, MASSACHUSETTS.

IMPROVEMENT IN UPHOLSTERY-SPRINGS.

Specification forming part of Letters Patent No. 147,247, dated February 10, 1874; application filed July 5, 1873.

*To all whom it may concern:*

Be it known that I, ELLIS DRAKE, of Stoughton, in the county of Norfolk and State of Massachusetts, have invented an Improvement in Springs, of which the following is a specification:

This invention has for its object to furnish springs for upholstery and other purposes, which shall be effective in operation, and that can be manufactured with little expense. To this end my invention consists of a plate of metal which is provided with a series of parallel incisions to form a series of square leaves, which gradually decrease in size, two of said plates after being thus formed being united together at their center by a rivet, or otherwise, as will be fully hereinafter described.

Figure 1:
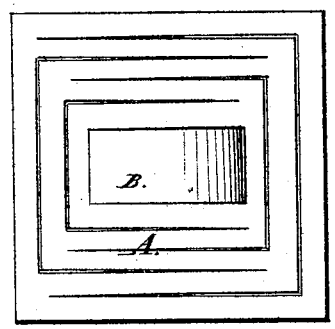
Figure 2:
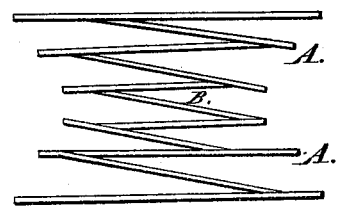

In the accompanying drawing, Figure 1 represents a top view of a spring constructed according to my invention; Fig. 2, a side elevation thereof.

In constructing my spring I take a plate, A, of metal, and cut the same in such a manner as to form square leaves B, each of said incisions to form the leaves being parallel and separate from each other. The leaves B gradually decrease in size, and at their center terminate in a square leaf, by which means two plates, formed as described, can easily be connected together by a rivet, or otherwise, as shown. The spring thus formed has its smaller leaves centrally disposed, by which means a very durable, strong, and elastic spring is produced, which can be employed in upholstery and other purposes.

It is evident that the size of the spring can be varied to enable it to be used under all circumstances where a spring is required.

I am aware that a spring has heretofore been constructed from two plates of metal connected at their center, and each plate having a slit in one continuous spiral line from near its center to near its margin, but such is not my invention.

My plates are provided with right parallel incisions or slits, each separate and distinct from the other, to form a series of square leaves, by which means the strength of the spring is increased, it is more durable, and its elasticity greatly improved.

I claim as my invention—

A spring composed of the plates A A, each having right parallel incisions, forming separate square leaves B, and both united at their center, in the manner and for the purposes herein specified.

In testimony that I claim the foregoing I have hereunto set my hand this 31st day of March, 1873.

ELLIS DRAKE.

Witnesses:
JARVIS PETTEE,
JABEZ TALBOT, Jr.